US006969818B2

(12) United States Patent
Miklos

(10) Patent No.: US 6,969,818 B2
(45) Date of Patent: Nov. 29, 2005

(54) TANDEM WELDING SHIELDING GASES

(75) Inventor: Ernst Miklos, Tutzing (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/142,930

(22) Filed: May 13, 2002

(65) Prior Publication Data
US 2002/0190033 A1  Dec. 19, 2002

(30) Foreign Application Priority Data
May 11, 2001 (DE) ................................ 101 22 869

(51) Int. Cl.$^7$ .............................................. B23K 9/16
(52) U.S. Cl. ....................................... 219/74; 219/129
(58) Field of Search ........................ 219/74, 137 WM, 219/129; 228/219; 252/372

(56) References Cited

U.S. PATENT DOCUMENTS

| | | | | |
|---|---|---|---|---|
| 4,034,179 A | * | 7/1977 | Koshiga et al. ................ | 219/74 |
| 4,572,942 A | | 2/1986 | Church | |
| 4,749,841 A | | 6/1988 | Galantino et al. | |
| 4,806,735 A | * | 2/1989 | Ditschun et al. ........ | 219/130.51 |
| 4,871,898 A | * | 10/1989 | Cherne et al. .......... | 219/137 R |
| 4,973,822 A | * | 11/1990 | Evans et al. ........... | 219/137 PS |
| 5,083,002 A | * | 1/1992 | Hoback et al. ................ | 219/74 |
| 5,210,388 A | * | 5/1993 | Farwer ........................ | 219/74 |
| 5,210,389 A | * | 5/1993 | Farwer ........................ | 219/74 |
| 5,313,039 A | * | 5/1994 | Harvey et al. ................ | 219/74 |
| 5,347,098 A | * | 9/1994 | Murakami et al. ............ | 219/61 |
| 5,667,702 A | * | 9/1997 | Soula et al. .................. | 219/75 |
| 5,667,703 A | * | 9/1997 | Soula et al. .................. | 219/75 |
| 5,739,503 A | * | 4/1998 | Rouault et al. ..... | 219/137 WM |
| 6,111,218 A | * | 8/2000 | Matile et al. ......... | 219/137 PS |
| 6,207,929 B1 | * | 3/2001 | Stava et al. ............ | 219/130.51 |
| 6,237,836 B1 | * | 5/2001 | Farwer ....................... | 228/219 |
| 6,274,838 B1 | * | 8/2001 | Demers et al. ............... | 219/74 |
| 6,303,892 B1 | * | 10/2001 | Farwer ....................... | 219/75 |
| 6,570,127 B2 | * | 5/2003 | Correia et al. .............. | 219/129 |
| 6,586,700 B2 | * | 7/2003 | Fortain et al. ................ | 219/74 |
| 6,596,971 B1 | * | 7/2003 | Biskup et al. ...... | 219/137 WM |

FOREIGN PATENT DOCUMENTS

| | | | | |
|---|---|---|---|---|
| DE | 23 63 456 A | 7/1975 | | |
| DE | 133538 | 1/1979 | | |
| DE | 4138835 | 5/1993 | | |
| DE | 4206105 | 9/1993 | | |
| DE | 4327672 | 12/1994 | | |
| DE | 4327671 | 2/1995 | | |
| DE | 4429228 | 8/1995 | | |
| DE | 69110148 | 3/1996 | | |
| DE | 69112015 | 4/1996 | | |
| DE | 69500831 | 2/1998 | | |
| DE | 19704513 | 3/1998 | | |
| DE | 19704511 | 4/1998 | | |
| DE | 69313385 | 4/1998 | | |
| DE | 19748351 | 5/1999 | | |
| DE | 19831834 | 10/1999 | | |
| DE | 19837039 | 2/2000 | | |
| DE | 69603393 | 2/2000 | | |
| DE | 69605497 | 7/2000 | | |
| EP | 0 207 019 A2 | * 12/1986 | .......... | B23K 35/38 |
| EP | 0207019 | 12/1986 | | |
| EP | 0 544 187 A | 6/1993 | | |
| EP | 0664181 | 7/1995 | | |
| FR | 2786719 | 6/2000 | | |
| GB | 1 517 097 A | 7/1978 | | |
| GB | 2132536 | 7/1984 | | |
| JP | 54-71744 | * 6/1979 | ............ | B23K 9/00 |
| JP | 60-72678 | * 4/1985 | ............ | B23K 9/16 |
| WO | 99/22901 | 5/1999 | | |

OTHER PUBLICATIONS

Patent Abstract of Japan—Publication No. 54071744 A—date of publication—Jun. 8, 1979—Applicant—Nippon Kokan KK, Inventor Osuga Tatsumi et al.

Patent Abstract of Japan—02235576 A—date of publication—Sep. 18, 1990—Applicant—Iwatani Internatl Corp.—Inventor—Saitou Yoshjii.

Patent Abstract of Japan—08238572 A—date of publication—Sep. 17, 1996—Applicant—Kobe Steel Ltd.—Inventor—Suga Tetsuo et al.

Patent Abstract of Japan—10137940 A—date of publication—May 26, 1998—Applicant—Daido Steel Co Ltd. Iwatani Gas KK—Inventor—Kondo Atsushi et al.

Patent Abstract of Japan—11291040 A—date of publication—Oct. 26, 1999—Applicant—Nippon Sanso KK—Inventor—Yamanishi Takeshi et al.

Derwent Abstract—92-173412/21—SU 1657322-AI.
Derwent Abstract—85-137742/23—JP 60072-678-A.

* cited by examiner

Primary Examiner—Kevin P. Kerns
(74) Attorney, Agent, or Firm—Millen, White, Zelano & Branigan, P.C.

(57) ABSTRACT

A shielding gas for gas shielded metal-arc welding or brazing with multiple (in particular 2) wire electrodes, one common melting bath, and multiple power sources. Such shielding gases contain, for example, a small percentage of carbon dioxide or doping gas and possibly hydrogen, 10%–75% helium, with the remainder argon. The process is applicable to aluminum materials and low alloy or high alloy steels, for example.

23 Claims, No Drawings

TANDEM WELDING SHIELDING GASES

The invention relates to shielding gases especially suitable for gas for gas metal-arc welding with multiple wire electrodes, especially with two wire electrodes.

Two gas shielded metal-arc welding processes with multiple wire electrodes are known from the technical literature, e.g., the periodical "Der Praktiker" No. 1, 2000, pages 18 and 19. The gas shielded metal-arc-double-wire process is a single-head welding process with two electrodes under a shielding gas and a common voltage source. The simultaneous melting of the two wire electrodes ensures higher melt yields and welding speeds compared to the single-wire process. This makes possible an increase in productivity. The other process is the so-called tandem-welding process. The latter offers a better monitoring of the process.

The present invention relates to "tandem welding or soldering", which is defined in "Merkblatt DSV 0909-1" on page 4 as a process with two consumable metal electrodes in one common melting bath. The two electrodes can have different potentials and different electrode feeding speeds FIG. 11 shows two power sources and two wire feeding motors (Drahtvorschube)). Tandem welding is also shown in U.S. Pat. No. 4,806,735 Ditschun et al. where on column 5, lines 50–51, it is stated that the electrodes are placed "in very close proximity, close as only 3 mm, more usually about 5 mm apart. It is different from "Doppeldrahtschweißen" (FIG. 10) where the is only one power source and one potential for both electrodes (see also JP 85-137742/23).

The processes of welding and soldering with arcs under a shielding gas are distinguished as follows: During welding, a weld pool develops from molten material and—if used—from the welding rod or the welding rods. During gas shielded metal-arc brazing, the material melts only slightly or not at all, however. The two processes are similar in many respects but special, process-specific problems also occur.

The spatial proximity of the two arcs causes them to influence each other. Electric and electromagnetic fields and forces are at work that influence the metal transition in the arc. Unless the parameters are optimally selected, these forces result in process disruptions, spattering, and, in the extreme case, in weld defects.

Attempts are now made to address these problems via wire distance, contact pipe distance or pulse parameters.

One object of this invention is to provide mixtures of gases especially suitable as a tandem-welding shielding gas or a tandem brazing shielding gas that prevents or reduces these problems.

Another object of this inventions is to provide tandem welding and brazing processes using the shielding gases.

Upon further study of this invention, other objects and advantages will become apparent.

To achieve these objects, there are provided several gases set forth in the claims, all of which contain helium. To use helium in a shielding gas is known for normal welding with one electrode (Marks' Standard Handbook) or for Doppeldrahtschweißen (JP 85-137742/23) or for welding with two melding baths (JP 54071744) U.S. Pat. No. 6,207, 929 wherein the two electrodes are separated and far from each other. However, heretofore, there was no suggestion to use helium as a shielding gas for the type of tandem welding or brazing of this invention, using a single bath.

The use of essentially 100% helium or admixture of helium in the shielding gas according to the invention results in an arc tightening and reduces the above-mentioned electromagnetic forces and their effects. Helium primarily replaces the less expensive argon; the higher ionization potential of helium relative to that of argon produces a better arc stability. Helium thus acts as an electric resistor. By the higher ionization potential, the volume of ionized gas that surrounds the two arcs is reduced. Moreover, at a constant voltage, helium produces a shorter arc. In the case of a short arc, the path that the drop must cover from the melting electrodes to the weld pool is shortened. Since on this segment, however, the danger exists that the drop will be deflected from its path by the field force that the second arc causes and land as a spatter on the material surface or the weld, helium effectively reduces spattering.

To date, two-component mixtures that consist of argon and $CO_2$ or argon and $O_2$ were recommended for the MAG-welding of steels, such as, e.g., structural steels and high-alloy steels (alloy steels and nickel-based materials). To a certain extent, $CO_2$ also produces arc tightening, but cannot be admixed at will, since in larger amounts, it hampers and strongly oxidizes the drop detachment. The helium that is proposed according to the invention is inert, however.

In the following discussion and in the claims, all percentages are by volume.

For unalloyed and low-alloy steels, a helium proportion of between 15% and 75% has proven especially advantageous. The helium proportion as well as the $CO_2$ proportion, which is in the range of 2% to 20%, or the $O_2$ proportion, which is between 1% and 6%, produce good weld appearance and high-quality compounds at high welding or soldering speeds.

In the case of high-alloy materials, in which the nickel-based materials and the high-alloy steels are included, helium mixtures with relatively low additions of $CO_2$ or $O_2$ show the best welding results. Here, helium also provides for a high arc stability and reduces the formation of spatters. A helium proportion of 10% to 99.95% or 99.97%, depending on the other components, is preferred. Especially preferred in this case is the range between 20% and 70%. By adding 0.05% to 5% $CO_2$ or 0.03% to 4% $O_2$, the advantages of these active gases result for example, in arc tightening. Whereas these active gases exhibit drawbacks, which include for example, the oxidation of the workpiece, the disadvantages are far outweighed by the advantages are still insignificant.

For MAG welding with two wire electrodes, the gas mixtures with the compositions of the claims have proven advantageous. During MIG-two-electrode welding, e.g., of aluminum materials, now primarily argon is used. Also here the helium admixture according to the invention acts as in the MAG welding.

The helium addition according to the invention can also be used with the newer "doped" gases, which contain small admixture components of $N_2$, $O_2$, NO or combinations of these gases. The admixtures are in the ppm range in most cases.

For welding and brazing of aluminum and aluminum alloys, in particular a mixture that consists of argon and helium, with a helium proportion of 10% to 75%, preferably 15% to 50%, especially preferably 20% to 30%, is suitable. In the case of aluminum materials, the high heat conductivity of helium is of special importance, since the latter provides for a good heat input at the welding site—despite the high heat conductivity of aluminum.

The adding of micro-admixtures improves the weld appearance and the weld quality significantly. As doping gases, $N_2$, $O_2$, NO or combinations of these gases are advantageously used. The doping is carried out in this case at 100–5000 vpm, preferably at 150–1000 vpm. The helium proportion provides for the above-mentioned advantages in the case of aluminum and is between 10% and 75%, preferably 15 and 50%, especially preferably 20% and 30%. Doping with 250 to 500 vpm of $O_2$ has proven especially effective.

In further development of the invention, hydrogen is added as an additional component to the shielding gas according to the invention. In this case, the range of concentration of hydrogen is between 0.1% and 8% is preferred. The $H_2$ proportion in the shielding gas produces an additional stabilization of the arc and a further improvement of the heat input. Also, the wetting behavior of the weld pool is further increased by the hydrogen. Depending on materials, however, at this time hydrogen-containing gases are recommended only for some nickel-based materials, since other materials, such as, e.g., aluminum alloys or steels with a ferrite proportion, do not tolerate any hydrogen.

The invention offers the following advantages:
Increased process stability
Splatter reduction
Reduction of the sensitivity of the process to disruption
Better weld shape by better weld flow
Reduction of oxidation with MAG
Reduction of pores with MIG
Better penetration with MIG.

("MIG" is an asserted trademark of Lincoln Electric Company of Cleveland, Ohio, as stated in the brochure of Lincoln Electric "Tandem MIG Process" E10.60 4/99.)

("MAG" is an abbreviation for gas metal-arc welding wherein the gas is an active gas as compared to an inert gas, e.g. $CO_2$.)

Primary users of the technology are the motor vehicle industry, the automobile industry, the railroad industry and suppliers as well as the machine-building and container industries.

The preceding examples can be repeated with similar success by substituting the generically or specifically described reactants and/or operating conditions of this invention for those used in the preceding examples.

The entire disclosures of all applications, patents and publications, cited above or below, and of corresponding German application No. 10122869.4, filed May 11, 2001 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

In the following claims, "low-alloy steels", "high-alloy steels" and "aluminum materials" are defined as:

A low-alloy steel has less than 5% by weight of any non-ferrous alloying element.

A high-alloy steel has more than 5% by weight of non-ferrous alloying elements, e.g. Cr, Mo, Ni.

An aluminum material contains aluminum as the main component, e.g. at least 50% by weight of aluminum.

What is claimed is:

1. In a process comprising tandem-welding or tandem-brazing metals comprising a metal-arc process with multiple wire electrodes having different potentials, one common melting bath, different electrode feeding speeds, and with the resultant arcs and field forces being spatially sufficiently close as to disrupt one another, the improvement comprising applying a shielding gas containing a sufficient percentage of helium to the region to be welded or brazed so as to provide high arc stability and a reduction of spatters, wherein the shielding gas comprises an admixture of 10%–99.97% helium and at least one component selected from the group consisting of Ar, $O_2$, $CO_2$, $N_2$, NO and $H_2$.

2. A process according to claim 1, wherein the shielding gas comprises the following components:
$CO_2$: 0.05% to 25%
He: 10%–99.95%,
Ar: remainder.

3. A process according to claim 1, wherein the shielding gas comprises the following components:
$O_2$: 0.03%–10%
He: 10% to 99.97%,
Ar: remainder.

4. A process according to claim 1, comprising tandem-welding or brazing unalloyed or low-alloy steels wherein the shielding gas comprises the following components:
$CO_2$: 2%–20%
He: 15%–75%,
Ar: remainder.

5. A process according to claim 1, comprising tandem-welding or brazing unalloyed or low-alloy steels wherein the shielding gas comprises the following components:
$O_2$: 1%–6%
He: 15%–75%,
Ar: remainder.

6. A process according to claim 1, comprising tandem-welding or brazing high-alloy steels wherein the shielding gas comprises the following components:
$CO_2$: 0.05%–5%
He: 10% to 99.95%,
Ar: remainder.

7. A process according to claim 6, wherein the shielding gas comprises 20 to 70% helium.

8. A process according to claim 1, comprising tandem-welding or brazing high-alloy steels wherein the shielding gas comprises the following components:
$O_2$: 0.03%–4%
He: 10%–99.97%,
Ar: remainder.

9. A process according to claim 8, wherein the shielding gas comprises 20 to 70% helium.

10. A process according to claim 1, comprising tandem-welding or brazing of aluminum materials wherein the shielding gas comprises the following components:
He: 10%–75%,
Ar: remainder.

11. A process according to claim 10, wherein the shielding gas comprises 20–30% of helium.

12. A process according to claim 1, comprising tandem-welding or brazing of aluminum materials wherein the shielding gas comprises $N_2$, $O_2$, NO or combinations thereof as doping gases.

13. A process according to claim 1, comprising tandem-welding or brazing of aluminum materials wherein the shielding gas comprises the following components:
Doping gas ($N_2$, $O_2$ and/or NO) 100–5000 vpm,
He: 10%–75%,
Ar: remainder.

14. A process according to claim 13, wherein the shielding gas comprises the following components:
Doping gas $O_2$ 250–500 vpm
He: 10%–75%,
Ar: remainder.

15. A process according to claim 14, wherein the shielding gas comprises 20–30% of helium.

16. A process according to claim 13, wherein the shielding gas comprises 20–30% of helium.

17. A process according to claim 1, wherein the shielding gas contains hydrogen, as an additional component.

18. A process according to claim 1, wherein said multiple wire electrodes consist of two wire electrodes.

19. A process according to claim 18, wherein the wire electrodes are spaced about 3–5 mm from one another.

20. A process according to claim 18, said wire electrode being fed by multiple power sources.

21. A process according to claim 1, wherein the wire electrodes are spaced about 3–5 mm from one another.

22. A process of tandem-welding or brazing of aluminum materials which comprises:

a metal-arc process with multiple wire electrodes having different potentials, one common melting bath and different electrode feeding speeds, wherein in said process, the resultant arcs and field forces are spatially sufficiently close as to disrupt one another, said method comprising the step of applying a shielding gas wherein the shielding gas comprises the following components:

Doping gas ($N_2$, $O_2$ and/or NO) 100–5000 vpm,

He: remainder.

23. A process of tandem-welding or tandem-brazing of metals which comprises:

a metal-arc process with multiple wire electrodes having different potentials, one common melting bath and different electrode feeding speeds, wherein in said process, the resultant arcs and field forces are spatially sufficiently close as to disrupt one another, said method comprising the step of applying a shielding gas comprising 10%–75% helium.

* * * * *